(12) United States Patent
Hibino et al.

(10) Patent No.: US 12,044,801 B2
(45) Date of Patent: Jul. 23, 2024

(54) DISTANCE MEASUREMENT DEVICE

(71) Applicant: Panasonic Intellectual Property Management Co., Ltd., Osaka (JP)

(72) Inventors: Kiyoshi Hibino, Kyoto (JP); Takashi Haruguchi, Aichi (JP); Masaomi Inoue, Aichi (JP); Kazuhisa Ide, Aichi (JP); Masahiro Shiihara, Aichi (JP); Kouichi Bairin, Aichi (JP); Kouichi Kumamaru, Osaka (JP); Hirotaka Ueno, Osaka (JP); Hideo Yamaguchi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 857 days.

(21) Appl. No.: 17/153,823

(22) Filed: Jan. 20, 2021

(65) Prior Publication Data

US 2021/0141062 A1 May 13, 2021

Related U.S. Application Data

(63) Continuation of application No. PCT/JP2019/013089, filed on Mar. 27, 2019.

(30) Foreign Application Priority Data

Aug. 29, 2018 (JP) ................................ 2018-160658

(51) Int. Cl.
*G01S 7/48* (2006.01)
*G01S 7/481* (2006.01)
(Continued)

(52) U.S. Cl.
CPC .......... *G01S 7/4813* (2013.01); *G01S 7/4817* (2013.01); *G02B 26/0816* (2013.01); *G02B 26/10* (2013.01)

(58) Field of Classification Search
None
See application file for complete search history.

(56) References Cited

U.S. PATENT DOCUMENTS 5,455,669 A 10/1995 Wetteborn
2007/0058230 A1 3/2007 Blug et al.
(Continued)

FOREIGN PATENT DOCUMENTS

JP H06-214027 A 8/1994
JP H10-090412 A 4/1998
(Continued)

OTHER PUBLICATIONS

International Search Report issued in corresponding International Patent Application No. PCT/JP2019/013089, dated Jun. 25, 2019, with English translation.

(Continued)

*Primary Examiner* — Hovhannes Baghdasaryan
(74) *Attorney, Agent, or Firm* — Rimon P.C.

(57) ABSTRACT

A distance measurement device for measuring a distance to an object that exists in a distance measurement region includes: a light source configured to emit laser light; a lens configured to converge the laser light emitted from the light source, into substantially parallel light; a tubular light blocking member disposed on an optical path of the laser light emitted from the light source and surrounding the optical path; a photodetector configured to detect reflected light, of the laser light, reflected at the distance measurement region; and a condensing lens configured to condense the reflected light passing through the outside of the light blocking member, onto the photodetector.

10 Claims, 11 Drawing Sheets

(51) Int. Cl.
*G02B 26/08* (2006.01)
*G02B 26/10* (2006.01)

(56) References Cited

U.S. PATENT DOCUMENTS

| | | |
|---|---|---|
| 2018/0188361 A1 | 7/2018 | Berger et al. |
| 2018/0275253 A1 | 9/2018 | Higashi et al. |
| 2019/0383939 A1* | 12/2019 | Mori .......................... B25J 9/10 |

FOREIGN PATENT DOCUMENTS

| | | |
|---|---|---|
| JP | 2010-117300 A | 5/2010 |
| JP | 2016-183924 A | 10/2016 |
| JP | 2017-083251 A | 5/2017 |
| JP | 2017-150858 A | 8/2017 |
| WO | 2018/011878 A1 | 1/2018 |
| WO | 2018/150998 A1 | 8/2018 |

OTHER PUBLICATIONS

Office Action issued in corresponding Chinese Application No. 201980044535.X, dated Dec. 8, 2023 w/English MT.

* cited by examiner

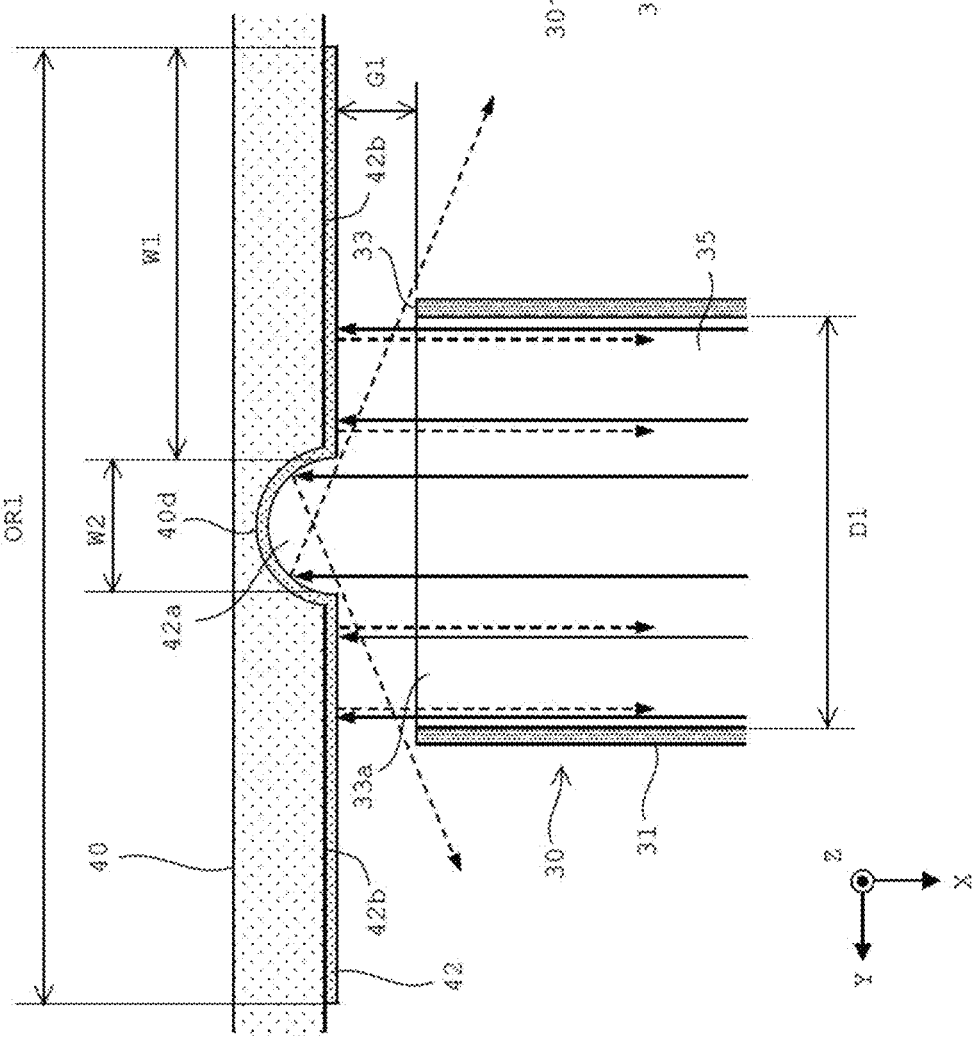
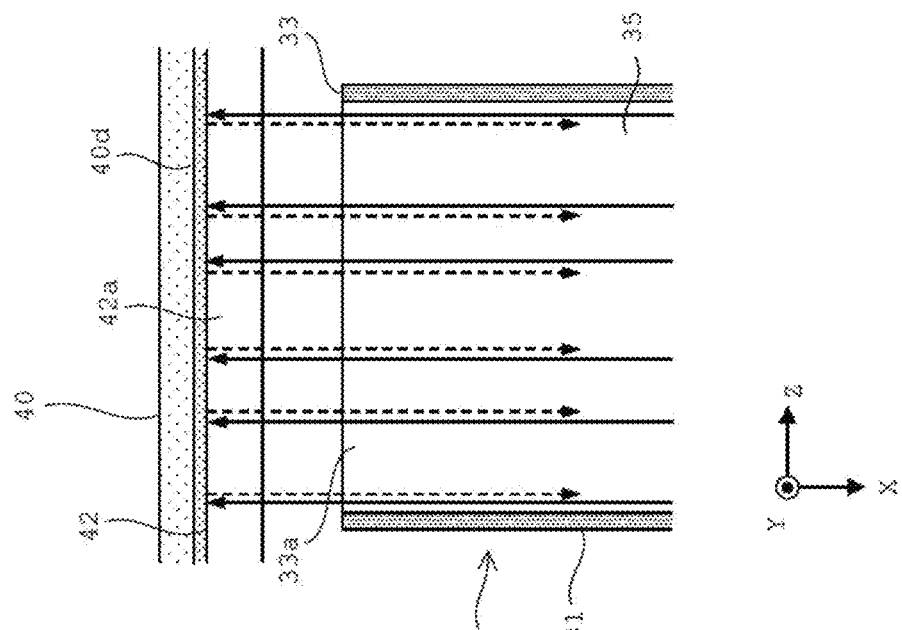
FIG. 8A
FIG. 8B

DISTANCE MEASUREMENT DEVICE

CROSS REFERENCE TO RELATED APPLICATION

This application is a continuation of International Application No. PCT/JP2019/13089 filed on Mar. 27, 2019, entitled "DISTANCE MEASUREMENT DEVICE", which claims priority under 35 U.S.C. Section 119 of Japanese Patent Application No. 2018-160658 filed on Aug. 29, 2018, entitled "DISTANCE MEASUREMENT DEVICE". The disclosure of the above application is incorporated herein by reference.

BACKGROUND OF THE INVENTION

1. Field of the Invention

The present invention relates to a distance measurement device that measures the distance to an object using light.

2. Disclosure of Related Art

To date, a distance measurement device that measures the distance to an object using light has been mounted on various apparatuses. As a method for measuring a distance using light, for example, a method for measuring the distance to an object on the basis of the time difference (time of flight) from the emission of light to the reception of reflected light, a method using the triangulation method, etc., have been known.

Japanese Laid-Open Patent Publication No. H06-214027 discloses a distance measurement device configured to rotate laser light using a mirror. In this distance measurement device, laser light incident along the rotation axis of the mirror is reflected by the mirror and applied to a distance measurement region. Reflected light, of the laser light, reflected by an object that exists in the distance measurement region travels backward on an optical path through which the laser light is applied, and is incident on the mirror. Thereafter, the reflected light is reflected by the mirror, guided to a condensing lens, and condensed onto a photodetector.

In the distance measurement device configured as described above, internal stray light that is generated inside the device and incident on the photodetector becomes a problem in the accuracy of distance measurement.

The intensity of reflected light that is reflected at the distance measurement region and incident on the photodetector is inversely proportional to the square of the distance from the distance measurement device to the distance measurement region. Thus, the longer the measured distance is, the lower the intensity of the reflected light is. On the other hand, internal stray light is generated, for example, by surface reflection of each member included in an optical system inside the device, and the like. Therefore, the optical distance until the internal stray light is incident on the photodetector is significantly shorter than the optical distance until the reflected light is incident on the photodetector.

Normally, in the optical system inside the device, a configuration (antireflection film) or the like for suppressing surface reflection is provided to each member of the optical system in order to suppress internal stray light as much as possible. However, even with this configuration, internal stray light cannot be completely eliminated, and a small amount of internal stray light is generated. Nevertheless, as described above, the optical distance until the internal stray light is incident on the photodetector is significantly shorter than the optical distance of the reflected light incident on the photodetector from the distance measurement region. Therefore, even a small amount of internal stray light has a great influence on the detection of reflected light.

SUMMARY OF THE INVENTION

A main aspect of the present invention is directed to a distance measurement device for measuring a distance to an object that exists in a distance measurement region. The distance measurement device according to this aspect includes: a light source configured to emit laser light; a lens configured to converge the laser light emitted from the light source, into substantially parallel light; a tubular light blocking member disposed on an optical path of the laser light emitted from the light source and surrounding the optical path; a photodetector configured to detect reflected light, of the laser light, reflected at the distance measurement region; and a condensing lens configured to condense the reflected light passing through the outside of the light blocking member, onto the photodetector.

In the distance measurement device according to this aspect, the light blocking member prevents the laser light from leaking to the inside of the device from the optical path of the laser light. Accordingly, internal stray light can be more reliably prevented from reaching the photodetector. Therefore, the influence of internal stray light on the distance measurement can be more reliably suppressed.

BRIEF DESCRIPTION OF THE DRAWINGS

The above and other objects and new features of the present invention will be fully clarified by the following description of the embodiment, when read in conjunction with accompanying drawings.

FIG. 8A and FIG. 8B are a top view and a side view, respectively, schematically showing a state of laser light emitted from the outlet of the light blocking member when the outlet of the light blocking member faces the opaque region in FIG. 6B, according to the embodiment;

It should be noted that the drawings are solely for description and do not limit the scope of the present invention by any degree.

DESCRIPTION OF THE PREFERRED EMBODIMENTS

Hereinafter, an embodiment of the present invention will be described with reference to the drawings. For convenience, in each drawing, X, Y, and Z axes that are orthogonal to each other are additionally shown. The Z-axis positive direction is the height direction of a distance measurement device 1.

Figure 1:
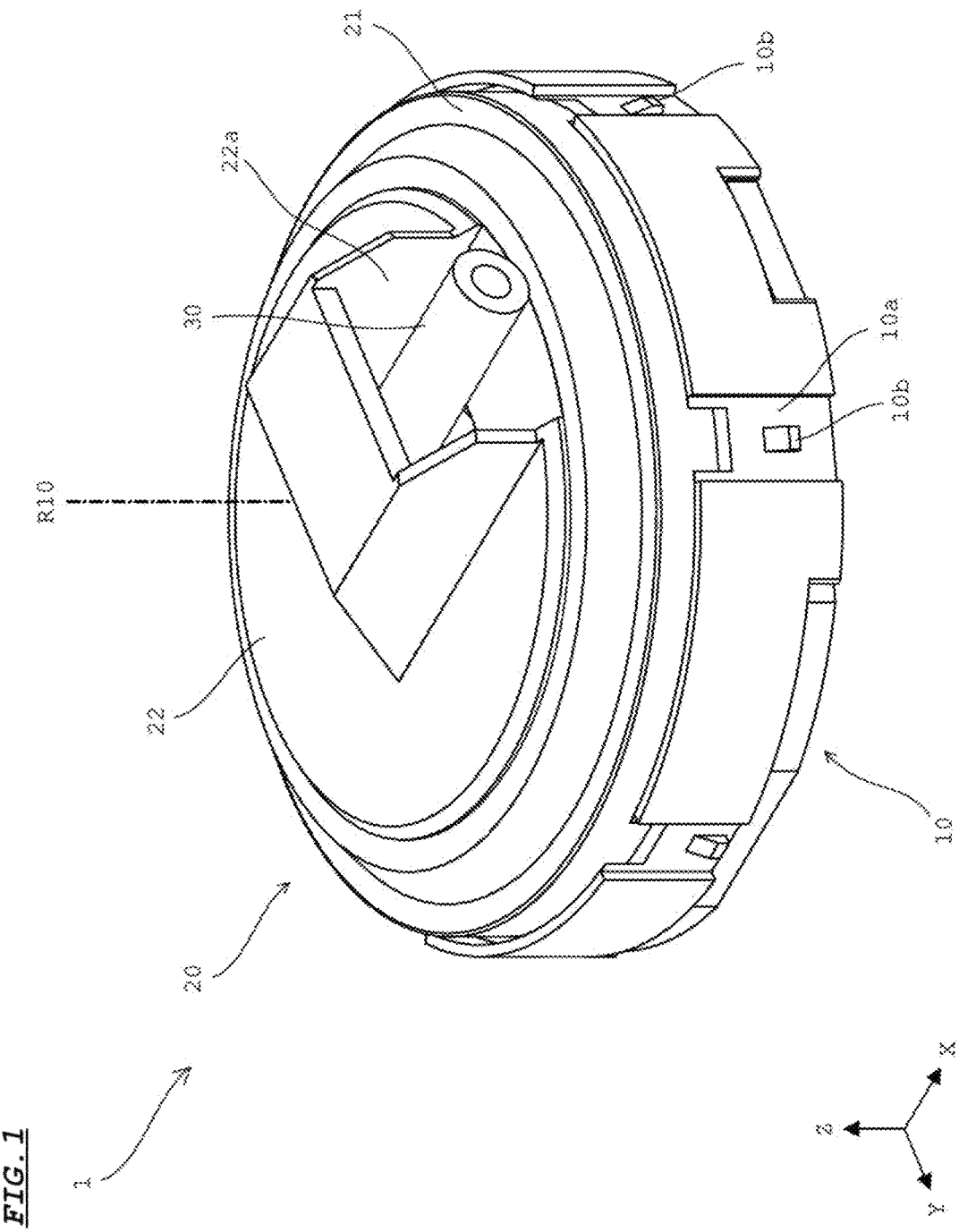
FIG. 1 is a perspective view showing a configuration of a distance measurement device according to an embodiment in a state where a cover is removed therefrom.
Figure 2:
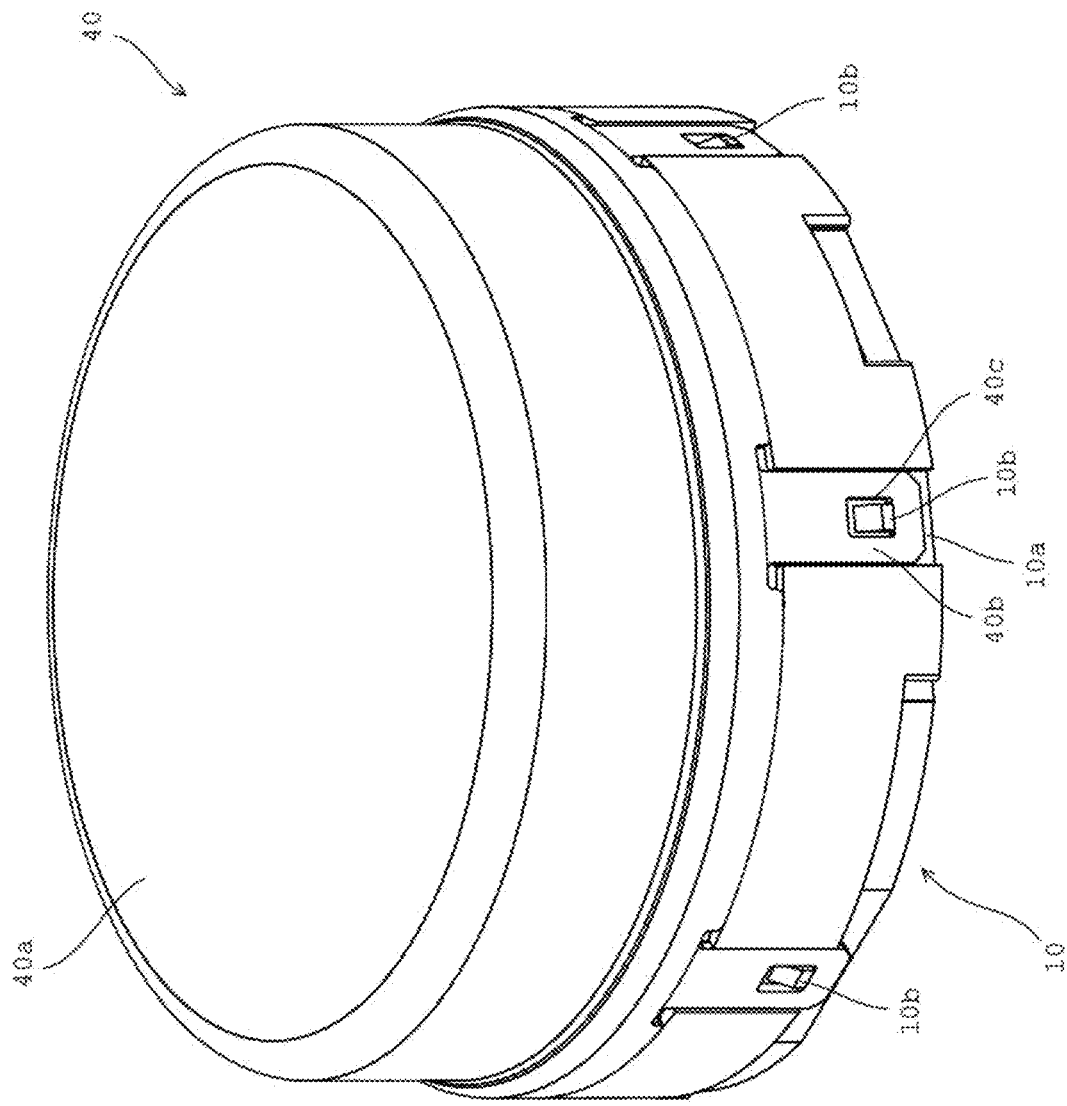
FIG. 2 is a perspective view showing a configuration of the distance measurement device according to the embodiment in a state where the cover is mounted thereon.

FIG. 1 is a perspective view showing a configuration of the distance measurement device 1 in a state where a cover 40 is removed therefrom, and FIG. 2 is a perspective view of a configuration of the distance measurement device 1 in a state where the cover 40 is mounted thereon.

As shown in FIG. 1, the distance measurement device 1 includes a cylindrical fixing part 10 and a rotary part 20 that is rotatably disposed on the fixing part 10. The rotary part 20 includes two support members 21 and 22 having diameters different from each other. The rotary part 20 is configured such that the support member 22 is installed on the upper surface of the support member 21. An opening 22a is provided in a side surface of the support member 22. A tubular light blocking member 30 protrudes from the opening 22a so as to be parallel to the X axis. Laser light (projection light) is projected from an end portion on the X-axis positive side (outlet) of the light blocking member 30 toward a distance measurement region. The light blocking member 30 is disposed at the rotary part 20 such that the outlet for laser light (end portion on the X-axis positive side) thereof faces in a direction away from a rotation center axis R10. The light blocking member 30 radially extends from the rotation center axis R10. Reflected light, of the laser light, reflected at the distance measurement region passes from the opening 22a through an area surrounding the light blocking member 30 and is taken into the inside of the distance measurement device 1.

The rotary part 20 rotates about a rotation center axis R10 that is parallel to the Z axis and extends through the center of the rotary part 20. As the rotary part 20 rotates, the light blocking member 30 rotates about the rotation center axis R10. Thus, the optical axis of the laser light projected from the light blocking member 30 rotates about the rotation center axis R10. Accordingly, the distance measurement region (position scanned with the laser light) also rotates.

The distance measurement device 1 measures the distance to an object that exists in the distance measurement region, on the basis of the time difference (time of flight) between the timing when the laser light is projected to the distance measurement region and the timing when the reflected light of the laser light from the distance measurement region is received. When the rotary part 20 makes one rotation about the rotation center axis R10 as described above, the distance measurement device 1 can measure the distances to objects that exist in substantially the entire range of 360 degrees around the distance measurement device 1.

Referring to FIG. 2, the cover 40 that allows the laser light to pass therethrough is installed on the fixing part 10 so as to cover the top and the lateral side of the rotary part 20. The cover 40 is formed from a material such as a resin that allows the laser light to pass therethrough and that does not allow light having wavelengths other than the wavelength of the laser light to pass therethrough. The cover 40 includes a bottomed cylindrical body portion 40a and six flange portions 40b protruding from the body portion 40a in the Z-axis negative direction. The six flange portions 40b are provided at equal intervals in the circumferential direction of the body portion 40a. Each flange portion 40b is fitted into a recess 10a formed in the fixing part 10. In addition, a through hole 40c provided in each flange portion 40b is engaged with a projection 10b formed on the recess 10a. Accordingly, the cover 40 is fixed to the fixing part 10.

The laser light emitted from the light blocking member in FIG. 1 is projected to the distance measurement region through the side surface of the body portion 40a. In addition, the reflected light, of the laser light, reflected by an object that exists in the distance measurement region is taken into the opening 22a in FIG. 1 through the side surface of the body portion 40a.

Figure 3:
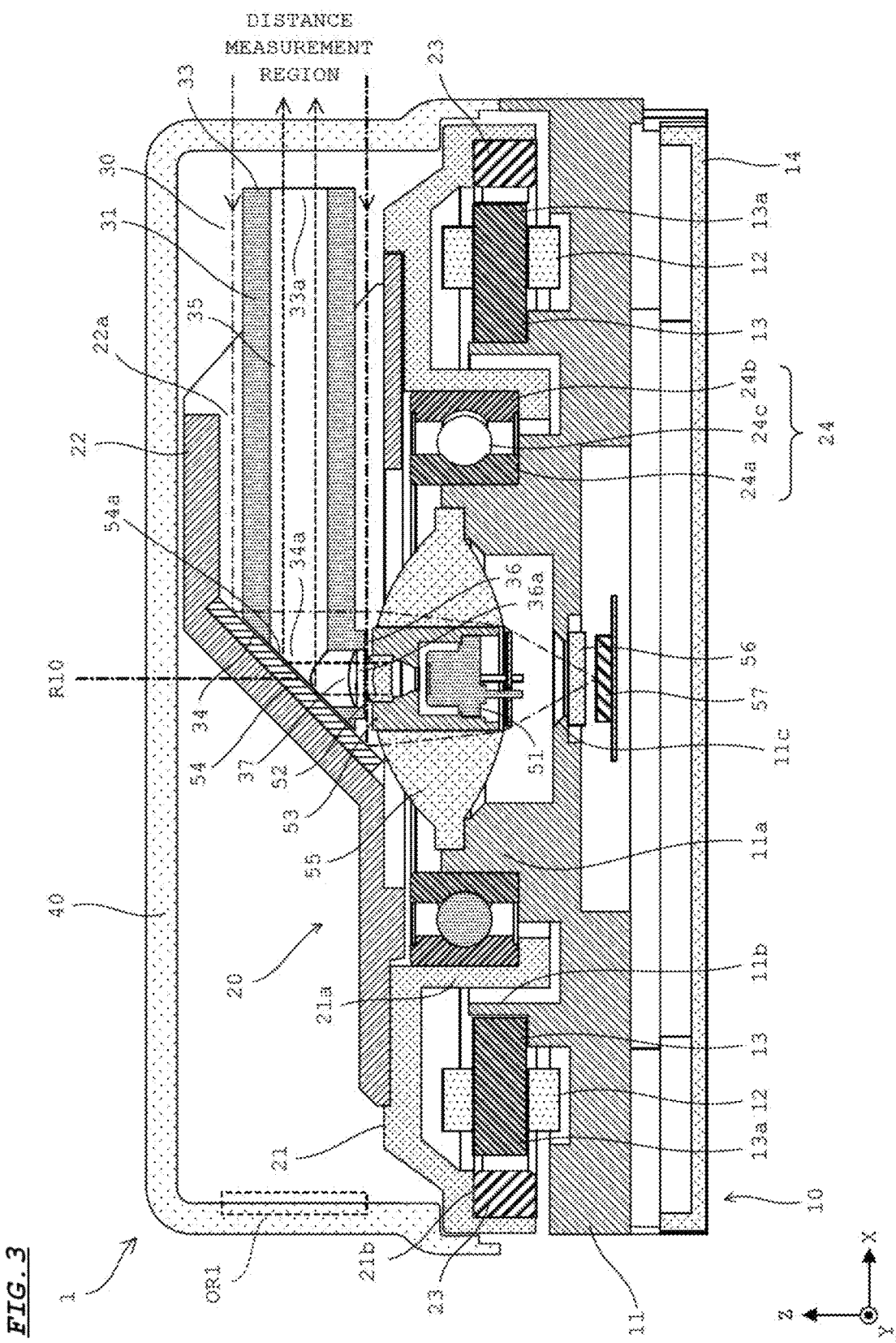
FIG. 3 is a cross-sectional view showing a configuration of the distance measurement device according to the embodiment.

FIG. 3 is a cross-sectional view showing the configuration of the distance measurement device 1.

FIG. 3 shows a cross-sectional view when the distance measurement device 1 shown in FIG. 2 is cut at the center position in the Y-axis direction along a plane parallel to the XZ plane. In FIG. 3, laser light (projection light) emitted from a light source 51 and travelling toward the distance measurement region is indicated by broken lines, and reflected light reflected from the distance measurement region is indicated by alternate long and short dash lines.

As shown in FIG. 3, the fixing part 10 includes a cylindrical support base 11, a plurality of coils 12, a yoke 13, and a bottom plate 14. The support base 11 is formed from, for example, a resin. The lower surface of the support base 11 is covered with the bottom plate 14 having a circular plate shape.

The support member 21 is installed on the support base via a cylindrical bearing 24. The bearing 24 has a configuration in which a plurality of bearing balls 24c are arranged between an inner cylinder 24a and an outer cylinder 24b so as to be aligned in the circumferential direction. A cylindrical tube portion 21a that projects in the Z-axis negative direction is formed in the support member 21, and a cylindrical tube portion 11a that projects in the Z-axis positive direction is formed in the support base 11. The outer diameter of the tube portion 11a is slightly larger than the inner diameter of the inner cylinder 24a of the bearing 24, and the inner diameter of the tube portion 21a is slightly smaller than the outer diameter of the outer cylinder 24b of the bearing 24. The bearing 24 is fitted between the tube portion 11a and the tube portion 21a, and the support member 21 is supported by the support base 11 so as to be rotatable about the rotation center axis R10.

In the support base 11, a cylindrical wall portion 11b is formed on the outer side of the tube portion 11a. The central axis of the wall portion 11b is aligned with the rotation center axis R10. The yoke 13 is fitted on the outer periphery of the wall portion 11b. The yoke 13 includes a plurality of projection portions 13a that radially protrude from a ring-shaped base portion. The intervals between the projection portions 13a in the circumference direction are constant. The coils 12 are wound and mounted on the projection portions 13a, respectively.

A step portion 21b is formed on an outer peripheral portion of the support member 21 so as to be continuous in the circumferential direction. A plurality of magnets 23 are installed on the step portion 21b without any gap in the circumferential direction. The adjacent magnets 23 have different polarities on the inner side. These magnets 23 face the projection portions 13a of the yoke 13. Therefore, by controlling a current to the coils 12, the rotary part 20 is rotationally driven about the rotation center axis R10. The coils 12, the yoke 13, and the bearing 24 form a drive unit that rotates a mirror 54 together with the rotary part 20 about the rotation center axis R10.

The rotation position of the rotary part 20 is detected by a position detection means that is not shown. For example, the position of a slit formed in the support member 21 so as to extend along the circumferential direction about the rotation center axis R10 is detected by a photo coupler. Accordingly, the rotation position of the rotary part 20 is detected.

The distance measurement device 1 includes the light source 51, a collimator lens 52, a holder 53, the mirror 54, a condensing lens 55, a filter 56, and a photodetector 57 as components of an optical system. The light source 51 is held by the holder 53 together with the collimator lens 52.

The light source 51 emits laser light having a predetermined wavelength. The light source 51 is, for example, a semiconductor laser. The emission optical axis of the light source 51 is parallel to the Z axis. The laser light emitted from the light source 51 is converted into parallel light by the collimator lens 52. The collimator lens 52 converges the laser light emitted from the light source 51, into substantially parallel light. The collimator lens 52 is composed of, for example, an aspherical lens. The laser light converted into parallel light is incident on the mirror 54 disposed above the condensing lens 55.

The light source 51 and the collimator lens 52 are installed in the condensing lens 55 in a state where the light source 51 and the collimator lens 52 are held by the holder 53. A circular opening is formed at the center of the condensing lens 55 so as to vertically penetrate the condensing lens 55, and the holder 53 having a columnar shape is fitted and installed in the opening. The light source 51 and the collimator lens 52 are fitted and installed in respective housing portions of the holder 53 with substantially no gap.

The mirror 54 is a reflecting mirror having a reflecting surface 54a on one surface thereof. The center position of the reflecting surface 54a is substantially aligned with the rotation center axis R10. The reflecting surface 54a has a rectangular shape elongated in the Y-axis direction. The mirror 54 is installed on the support member 22 of the rotary part 20 such that the long axis thereof, that is, the axis parallel to the long direction thereof, is parallel to the Y axis, and the angle between the reflecting surface 54a and the rotation center axis R10 is 45°.

The laser light that is incident on the mirror 54 via the collimator lens 52 is reflected by the mirror 54 in a direction perpendicular to the rotation center axis R10. Thereafter, the laser light is projected through the opening 22a to the distance measurement region.

In the present embodiment, the tubular light blocking member 30 is installed at the support member 22 of the rotary part 20 so as to surround the optical path of the laser light emitted from the light source 51.

Figure 4B:
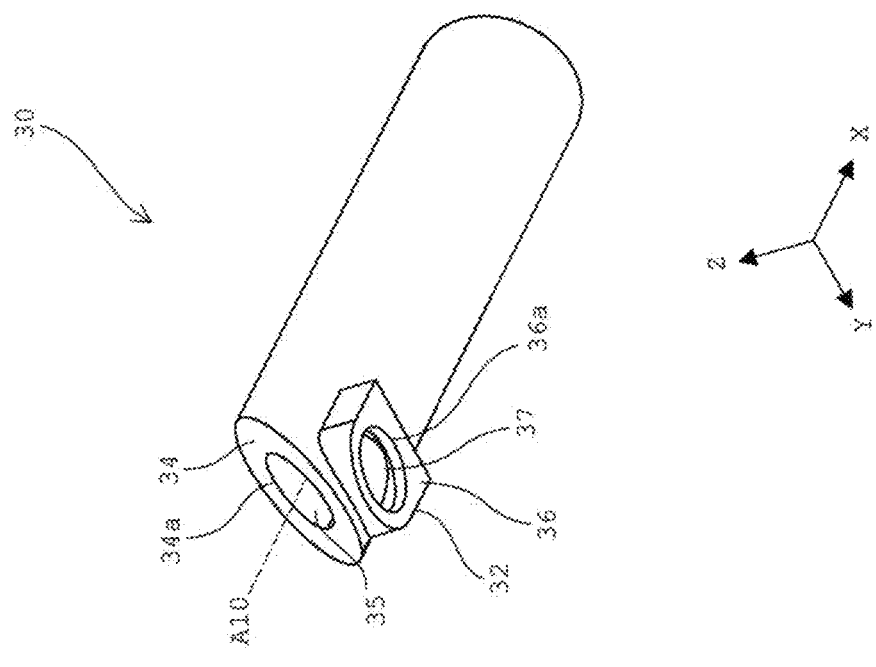
FIG. 4A and FIG. 4B are each a perspective view showing a configuration of a light blocking member according to the embodiment.
Figure 4A:
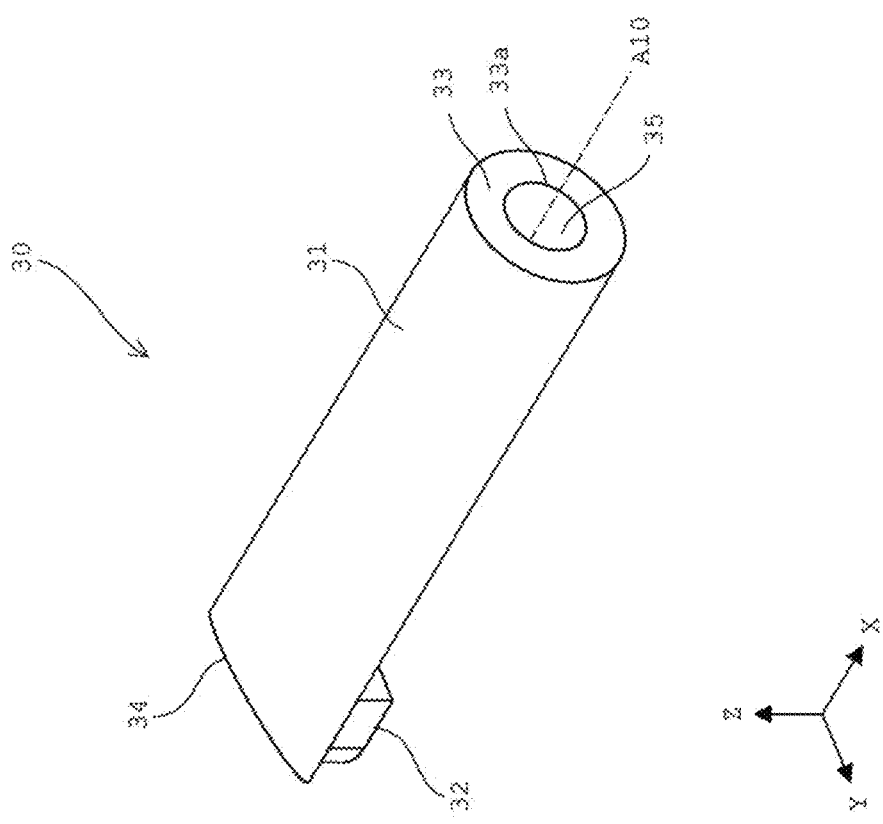

FIGS. 4A and 4B are each a perspective view showing a configuration of the light blocking member 30. FIG. 4A is a perspective view of the light blocking member 30 as viewed from the Z-axis positive side, and FIG. 4B is a perspective view of the light blocking member 30 as viewed from the Z-axis negative side.

The light blocking member 30 is formed from an opaque material such as a resin. The light blocking member 30 includes a cylindrical tube portion 31 and a pedestal portion 32 formed on the lower surface of the tube portion 31 on the X-axis negative side. An end surface 33 is formed at the end edge on the X-axis positive side of the tube portion 31 so as to be perpendicular to a central axis A10 of the tube portion 31. An inclined surface 34 is formed at the end edge on the X-axis negative side of the tube portion 31 so as to be inclined relative to the central axis A10 of the tube portion 31 in a direction parallel to the X-Z plane. A circular through hole 35 is formed in the tube portion 31 so as to penetrate the tube portion 31 from the end surface 33 to the inclined surface 34. Accordingly, an opening 33a is formed in the end surface 33, and an opening 34a is formed in the inclined surface 34. The central axis of the through hole 35 coincides with the central axis A10 of the tube portion 31.

The pedestal portion 32 has a lower surface 36 parallel to the X-Y plane. A circular hole 37 is formed in the pedestal portion 32 so as to extend from the lower surface 36 in the Z-axis positive direction. Accordingly, an opening 36a is formed in the lower surface 36. The hole 37 is connected to the through hole 35 of the tube portion 31.

Referring back to FIG. 3, the light blocking member 30 is installed at the support member 22 such that the lower surface 36 of the pedestal portion 32 faces the upper surface of the holder 53 with substantially no gap and the opening 34a formed in the inclined surface 34 is closed by the reflecting surface 54a of the mirror 54. As shown in FIG. 3, the inclined surface 34 of the light blocking member 30 has an inclination angle equal to that of the mirror 54. That is, the inclined surface 34 extends along the inclination of the mirror 54.

The laser light having passed through the collimator lens 52 enters the inside of the light blocking member 30 through the opening 36a of the light blocking member 30 and is incident on the mirror 54 through the hole 37 of the light blocking member 30. Thereafter, the laser light is reflected in the X-axis positive direction by the mirror 54 and emitted in the X-axis positive direction from the opening 33a of the end surface 33 through the through hole 35 of the light blocking member 30. The opening 36a of the light blocking member 30 is an inlet for the laser light with respect to the light blocking member 30, and the opening 33a of the light blocking member 30 is an outlet for the laser light with respect to the light blocking member 30. The laser light emitted from the opening 33a passes through the side surface of the cover 40 and is projected to the distance measurement region.

When an object exists in the distance measurement region, the laser light projected from the opening 33a to the distance measurement region is reflected by the object and travels toward the opening 22a. Of the reflected light travelling toward the opening 22a, the reflected light passing through the outside of the light blocking member 30 is taken in through the opening 22a and guided to the mirror 54. Thereafter, the reflected light is reflected by the mirror 54 in the Z-axis negative direction. The reflected light reflected by the mirror 54 undergoes a convergence action by the condensing lens 55.

Thereafter, the reflected light is incident on the filter 56 via a hole 11c formed in the support base 11. Accordingly, the reflected light is converged on the photodetector 57 via the filter 56. The filter 56 is configured to transmit light in the wavelength band of the laser light emitted from the light source 51 and block light in the other wavelength bands. The photodetector 57 outputs a detection signal corresponding to the amount of received light. The photodetector 57 is, for example, an avalanche photodiode. The detection signal from the photodetector 57 is outputted to a circuitry disposed on a circuit board that is not shown.

In the present embodiment, due to the configuration in which the light source 51 and the collimator lens 52 are installed in the condensing lens 55 and the light blocking member 30 is further disposed, a part of the reflected light travelling toward the opening 22a is blocked by the light blocking member 30 and the holder 53 and is not condensed onto the photodetector 57. For example, most of reflected light in a range indicated by the alternate long and short dash lines in FIG. 3 is blocked by the holder 53. However, in the present embodiment, the shapes of the mirror 54 and the opening 22a are long in the Y-axis direction, and the effective diameter of the condensing lens 55 is set so as to be substantially equal to the width in the long side direction of the mirror 54. Thus, the reflected light travelling in a region deviating from the light blocking member 30 in the Y-axis direction is condensed onto the photodetector 57 by the condensing lens 55. Accordingly, a sufficient amount of the reflected light can be guided to the photodetector 57.

Figure 5A:
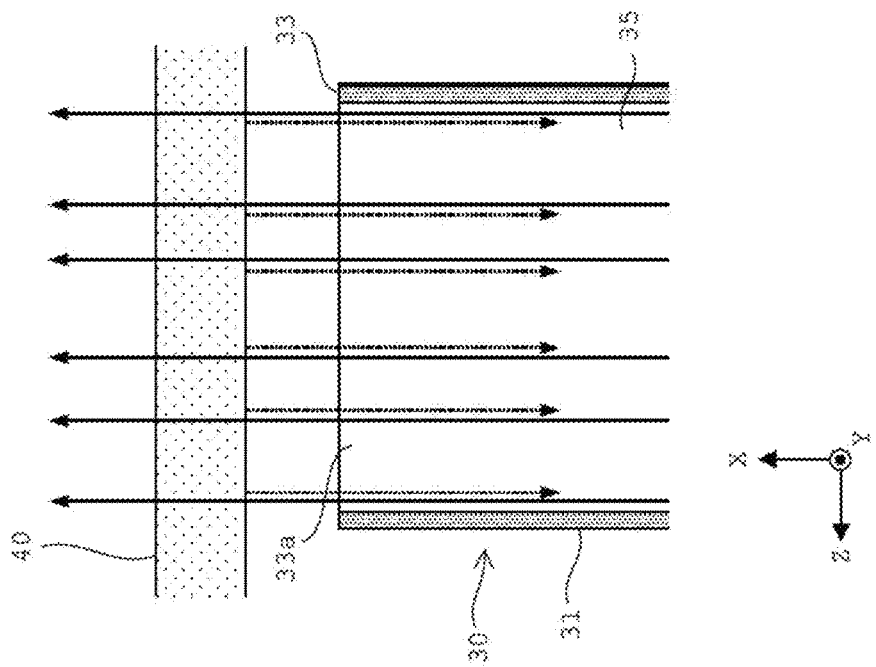
FIG. 5A and FIG. 5B are a top view and a side view, respectively, schematically showing a state of laser light emitted from an outlet of the light blocking member when the outlet of the light blocking member faces in a front direction, according to the embodiment.
Figure 5B:
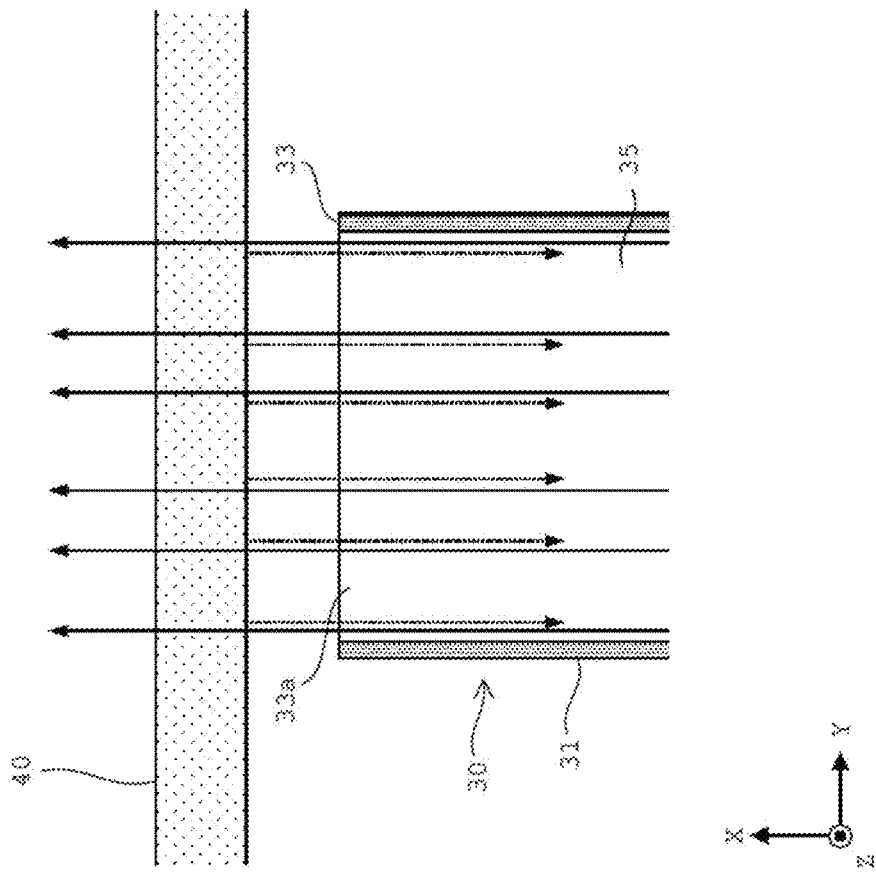

FIGS. 5A and 5B are a top view and a side view, respectively, schematically showing a state of the laser light emitted from the outlet (opening 33a) of the light blocking member 30 when the outlet (opening 33a) of the light blocking member 30 faces in the X-axis positive direction which is the front direction.

FIG. 5A is a cross-sectional view when the tube portion 31 is cut at the center position thereof in the Z-axis direction along a plane parallel to the X-Y plane, and FIG. 5B is a cross-sectional view when the tube portion 31 is cut at the center position thereof in the Y-axis direction along a plane parallel to the X-Z plane. In FIGS. 5A and 5B, solid line arrows indicate the laser light emitted from the opening 33a, and broken line arrows indicate the laser light reflected by the inner surface of the cover 40.

Most of the laser light travelling from the opening 33a toward the cover 40 passes through the cover 40 and is projected to the distance measurement region. However, a part of the laser light is reflected by the inner surface or the outer surface of the cover 40 toward the inside of the cover 40. In the case where the light blocking member 30 is not disposed, this part of the laser light can become internal stray light and be incident on the photodetector 57.

On the other hand, in the present embodiment, since the light blocking member 30 is disposed, substantially the entirety of the part of the laser light reflected by the inner surface or the outer surface of the cover 40 travels through the opening 33a to the inside of the light blocking member 30. Thus, this part of the laser light is prevented from becoming the internal stray light and being incident on the photodetector 57. Therefore, the reflected light from the distance measurement region can be accurately detected, so that distance measurement can be more accurately performed. According to the verification by the present inventors, a detection signal of the photodetector 57 based on internal stray light was able to be reduced to substantially a zero level by disposing the light blocking member 30 as shown in FIG. 3.

Meanwhile, in the distance measurement device 1, the light source 51 and the photodetector 57 may deteriorate due to factors such as aging. Therefore, the distance measurement device 1 is required to perform control such as detecting and notifying such deterioration.

Therefore, in the present embodiment, a configuration for detecting deterioration of the light source 51 and the photodetector 57 is provided. Specifically, a configuration that positively generates internal stray light when the rotary part is at a predetermined rotation position, is provided. As described above, in the present embodiment, the amount of internal stray light incident on the photodetector 57 can be reduced to substantially zero by the light blocking member 30. Therefore, if a predetermined amount of internal stray light is generated when the rotary part 20 is at the predetermined rotation position, a detection signal outputted from the photodetector 57 at this timing is based on the generated internal stray light. Thus, deterioration of the light source 51 and the photodetector 57 can be detected on the basis of this detection signal.

In the present embodiment, as shown in FIG. 3, an opaque region OR1 is provided on the side opposite to the front of the cover 40, that is, on the inner surface on the X-axis negative side of the cover 40. When the rotary part 20 rotates by 180 degrees from the state of FIG. 3, the opening 33a (outlet) of the light blocking member 30 faces the opaque region OR1. Even when the light source 51 is caused to emit light in a pulsed manner at this timing, the laser light emitted from the opening 33a is blocked by the opaque region OR1 and is not emitted to the outside of the cover 40.

The opaque region OR1 is provided with a structure that reflects a part of the laser light emitted from the opening 33a (outlet) of the light blocking member 30 and direct the part of the laser light to the outside of the end portion on the opening 33a (outlet) side of the light blocking member 30. In the present embodiment, the opaque region OR1 is provided with a recess as this structure.

Figure 6B:
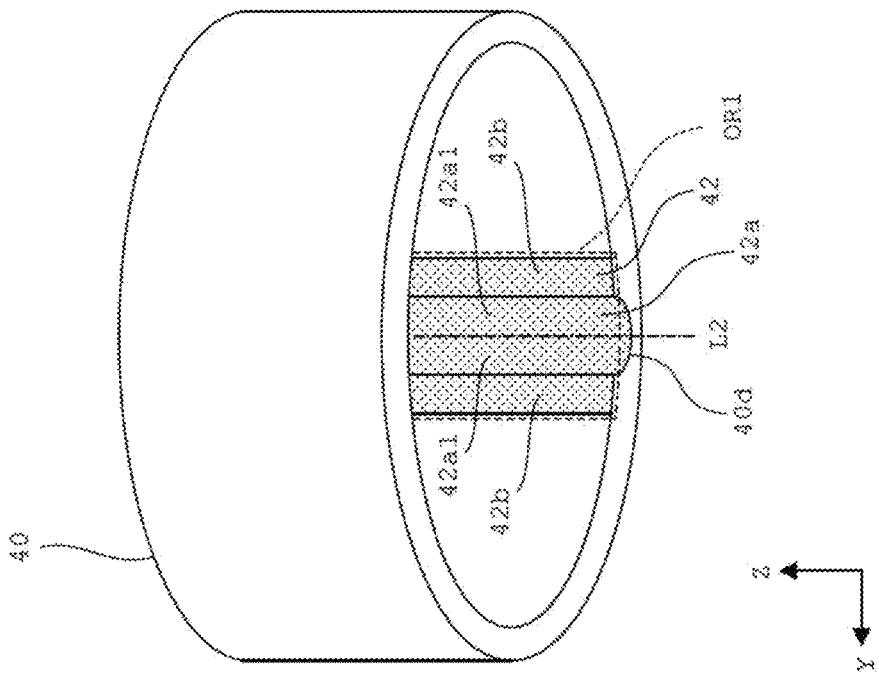
FIG. 6A and FIG. 6B are each a perspective view schematically showing a configuration example of an opaque region provided on the inner surface of the cover according to the embodiment.
Figure 6A:
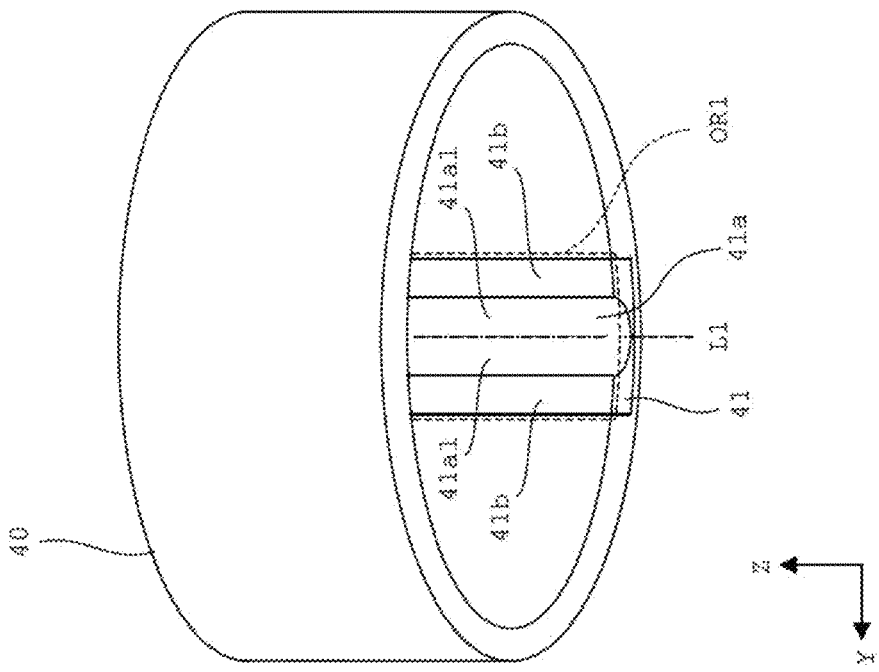

FIGS. 6A and 6B are each a perspective view schematically showing a configuration example of the opaque region OR1 provided on the inner surface of the cover 40. For convenience, the cover 40 is shown in a simple cylindrical shape in FIGS. 6A and 6B.

In the configuration example of FIG. 6A, a recess is formed at a position corresponding to the opaque region OR1 on the inner surface of the cover 40, and an opaque member 41 is fitted and installed in this recess. The opaque member 41 is formed from, for example, a material such as a resin. The opaque member 41 has a uniform width in the circumferential direction of the inner surface of the cover 40.

A recess 41a is formed on the inner surface of the opaque member 41 at the center position in the circumferential direction so as to extend in the Z-axis direction. The recess 41a has a linear valley line L1 extending in the Z-axis direction at the center position thereof in the circumferential direction, and has curved slopes 41a1 recessed outward on both sides of the valley line L1 in the circumferential direction, respectively. The two slopes 41a1 are joined at the valley line L1. In this configuration example, the two slopes 41a1 have the same shape. The two slopes 41a1 are symmetrical about a plane that passes through the valley line L1 and that is parallel to the X-Z plane. The opaque member 41 has inner surfaces 41b on both sides of the recess 41a in the circumferential direction, respectively. These inner surfaces 41b have the same curvature as that of the inner surface of the cover 40.

In the configuration example of FIG. 6B, a reflecting surface 42 is formed at a position corresponding to the opaque region OR1 on the inner surface of the cover 40. The reflecting surface 42 is formed, for example, by adhering a reflective material to the opaque region OR1. The reflecting surface 42 has a uniform width in the circumferential direction of the inner surface of the cover 40.

A recess 40d is formed on the inner surface of the cover 40 at the center position in the circumferential direction of the opaque region OR1 so as to extend in the Z-axis direction. Therefore, a recess 42a is formed on the reflecting surface 42 so as to extend along the recess 40d. The recess 42a has a linear valley line L2 extending in the Z-axis direction at the center position thereof in the circumferential direction, and has curved slopes 42a1 recessed outward on both sides of the valley line L2 in the circumferential direction, respectively.

The two slopes 42a1 are joined at the valley line L2. In this configuration example, the two slopes 42a1 have the same shape. The two slopes 42a1 are symmetrical about a plane that passes through the valley line L2 and that is parallel to the X-Z plane. The reflecting surface 42 has inner surfaces 42b on both sides of the recess 42a in the circumferential direction, respectively. These inner surfaces 42b have the same curvature as that of the inner surface of the cover 40.

Figure 7B:
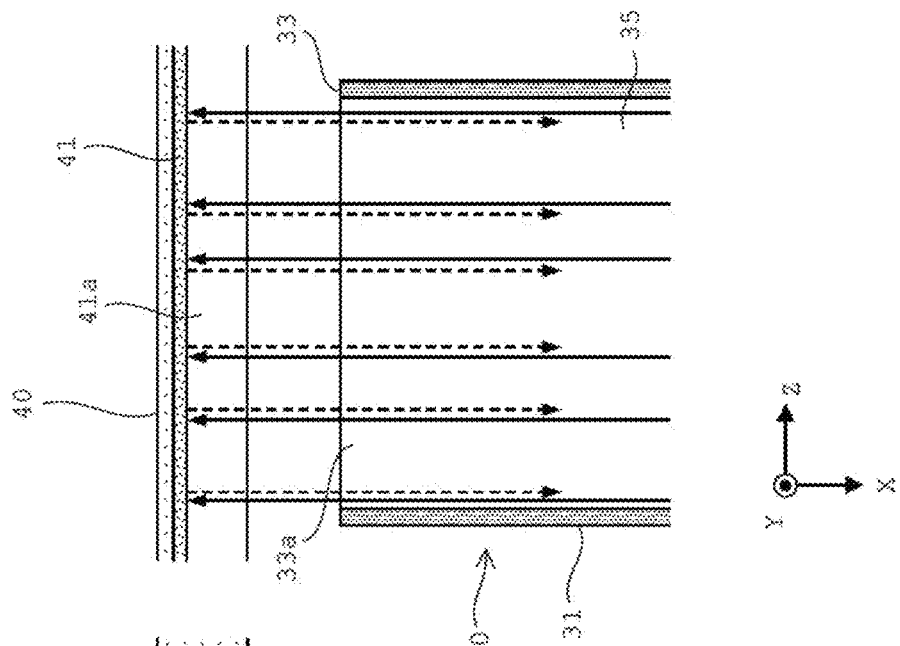
FIG. 7A and FIG. 7B are a top view and a side view, respectively, schematically showing a state of laser light emitted from the outlet of the light blocking member when the outlet of the light blocking member faces the opaque region in FIG. 6A, according to the embodiment.
Figure 7A:
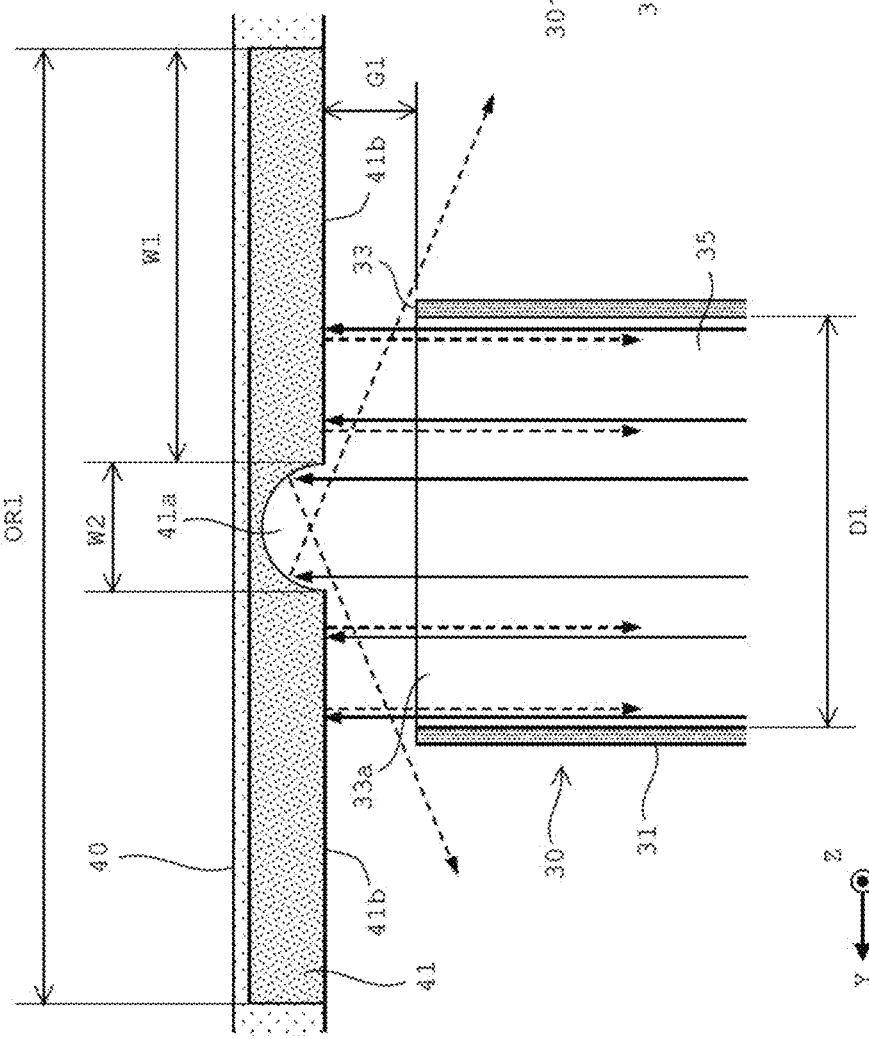

FIGS. 7A and 7B are a top view and a side view, respectively, schematically showing a state of the laser light emitted from the outlet (opening 33a) of the light blocking member 30 when the outlet (opening 33a) of the light blocking member 30 faces the opaque region OR1 in FIG. 6A.

FIG. 7A is a cross-sectional view when the tube portion 31 is cut at the center position thereof in the Z-axis direction along a plane parallel to the X-Y plane, and FIG. 7B is a cross-sectional view when the tube portion 31 is cut at the center position thereof in the Y-axis direction along a plane parallel to the X-Z plane. In FIGS. 7A and 7B, solid line arrows indicate the laser light emitted from the opening 33a, and broken line arrows indicate the laser light reflected by the inner surface of the cover 40.

As shown in FIG. 7A, the laser light emitted from the opening 33a is blocked by the opaque member 41, and thus is not projected to the outside of the cover 40. Of the laser light, most of the laser light incident on the inner surface 41b of the opaque member 41 is absorbed by the opaque member 41, and a part of the laser light incident on the inner surface 41b of the opaque member 41 is reflected by the opaque member 41. Substantially the entirety of the reflected laser light travels through the opening 33a to the inside of the light blocking member 30. Thus, this part of the laser light does not become internal stray light and is not incident on the photodetector 57.

Of the laser light emitted from the opening 33a, a part of the laser light incident on the recess 41a is reflected by the inner surface of the recess 41a and travels to the outside of the end surface 33 of the light blocking member 30. This laser light is not taken into the light blocking member 30, thus becomes internal stray light, and is radiated inside the device. A part of the laser light that has become internal stray light in this manner reaches the photodetector 57. Accordingly, a detection signal based on the internal stray light is generated from the photodetector 57. As shown in FIG. 7B, the reflected light of the laser light does not spread in the Z-axis direction due to the recess 41a, and thus the entirety of the reflected light does not deviate from the end surface 33 in the Z-axis direction. Therefore, internal stray light does not occur in the Z-axis direction.

The amount of internal stray light generated by the recess 41a can be controlled on the basis of the shape and curvature of the recess 41a, a width W2 of the recess 41a, the diameter of the through hole 35 (inner diameter D1 of the tube portion 31), and a gap G1 between the end surface 33 and the inner surface 41b of the opaque member 41. Therefore, the amount of internal stray light (laser light) reaching the photodetector 57 when the laser light is emitted from the light source 51 with predetermined power can be adjusted by adjusting these parameters. During distance measurement operation, when the detection value of internal stray light actually detected by the photodetector 57 significantly deviates from a detection value that should be obtained as a result of adjustment of the parameters, it can be detected that deterioration has occurred in the light source 51 and the photodetector 57. Alternatively, when the detection value of internal stray light tends to decrease significantly, it can be detected that deterioration has occurred in the light source 51 and the photodetector 57.

When the light blocking member 30 shifts from the recess 41a due to rotation, a part of the opening 33a overlaps the transparent portion of the cover 40, and a part of the emitted light from the opening 33a passes through the cover 40 and is projected to the outside of the cover 40. In this case, the emitted light projected to the outside is reflected by an object in the surrounding area, enters the inside of the cover 40, and is incident on the photodetector 57 via the opening 33a. Such light becomes unnecessary light in the detection of internal stray light, and thus it is necessary to prevent such light from being incident on the photodetector 57. The amount of such light depends on the distance to the object and a reflectance. Thus, when this light is incident on the photodetector 57, the light interferes with the detection of internal stray light. In order to prevent such light from entering from the outside, a width W1 of a range on each side of the recess 41a of the opaque member 41 is preferably as large as possible. The width W1 is preferably set so as to be larger than the inner diameter D1 of the tube portion 31, that is, the diameter of the through hole 35.

FIGS. 8A and 8B are a top view and a side view, respectively, schematically showing a state of the laser light emitted from the outlet (opening 33a) of the light blocking member 30 when the outlet (opening 33a) of the light blocking member 30 faces the opaque region OR1 in FIG. 6B.

FIG. 8A is a cross-sectional view when the tube portion 31 is cut at the center position thereof in the Z-axis direction along a plane parallel to the X-Y plane, and FIG. 8B is a cross-sectional view when the tube portion 31 is cut at the center position thereof in the Y-axis direction along a plane parallel to the X-Z plane. In FIGS. 8A and 8B, solid line arrows indicate the laser light emitted from the opening 33a, and broken line arrows indicate the laser light reflected by the inner surface of the cover 40.

The behavior of the laser light in FIGS. 8A and 8B is the same as in the case of FIGS. 7A and 7B, except most of the laser light is reflected by the reflecting surface 42. In this case as well, reflected light, of the laser light, which is incident on the inner surface 42b of the reflecting surface 42 enters the inside of the light blocking member 30 through the opening 33a, and thus does not become internal stray light. The reflected light, of the laser light, which is incident on the recess 42a, travels to the outside of the end surface 33 of the light blocking member 30 and becomes internal stray light.

In this case as well, the amount of internal stray light generated by the recess 42a can be controlled on the basis of the shape and curvature of the recess 42a, a width W2 of the recess 42*a*, the diameter of the through hole 35 (inner diameter D1 of the tube portion 31), and the gap G1 between the end surface 33 and the inner surface 42*b* of the reflecting surface 42. Therefore, the amount of internal stray light (laser light) reaching the photodetector 57 when the laser light is emitted from the light source 51 with predetermined power can be adjusted by adjusting these parameters. As a result, similar to the above, deterioration of the light source 51 and the photodetector 57 can be detected by referring to the value of the detection signal outputted from the photodetector 57.

Figure 9:
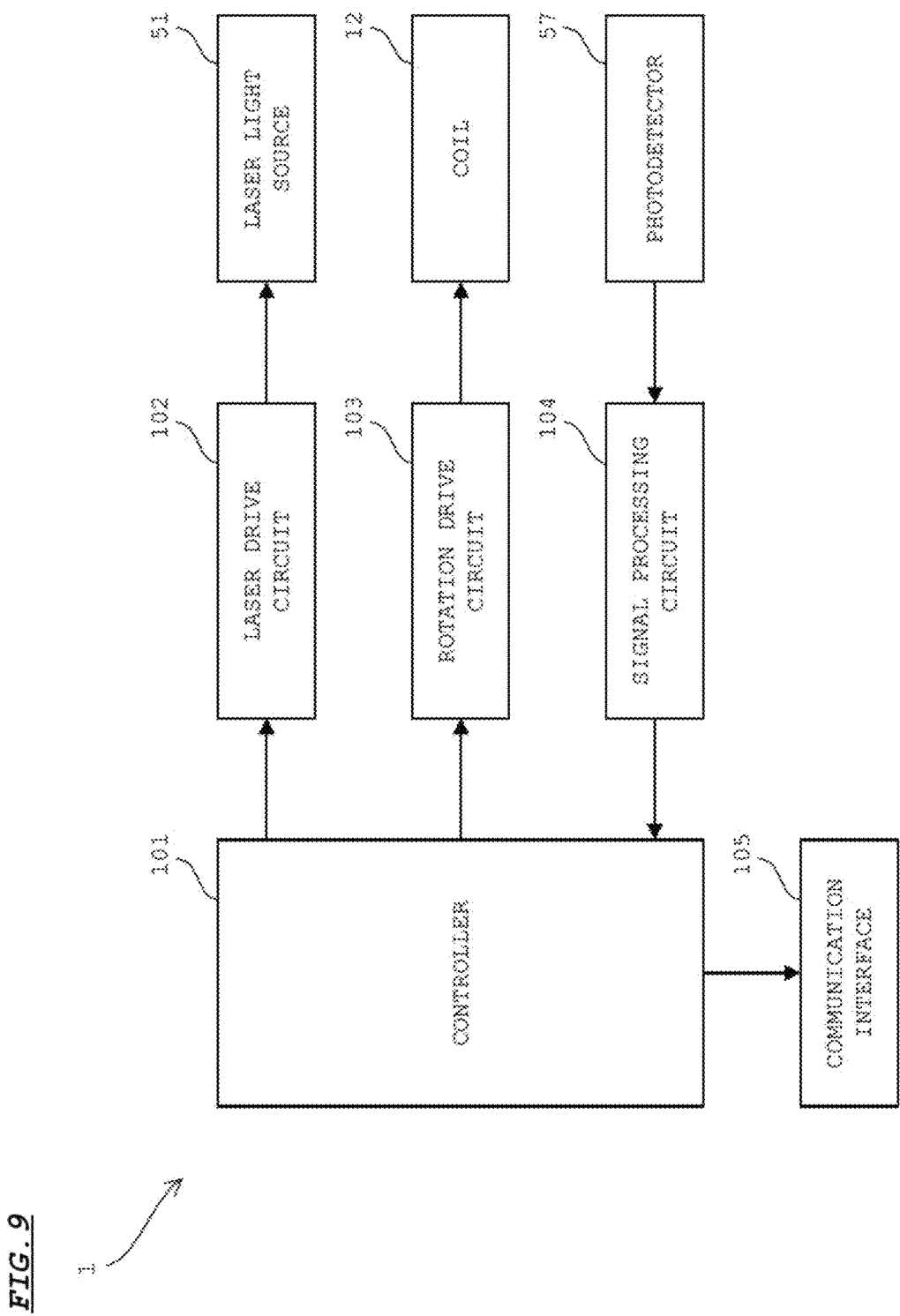
FIG. 9 is a diagram showing a configuration of a circuitry of the distance measurement device according to the embodiment.

FIG. 9 is a diagram showing a configuration of the circuitry of the distance measurement device 1.

As shown in FIG. 9, the distance measurement device 1 includes a controller 101, a laser drive circuit 102, a rotation drive circuit 103, and a signal processing circuit 104 as components of the circuitry.

The controller 101 includes an arithmetic processing circuit such as a CPU (central processing unit), and a memory, and controls each part according to a predetermined control program. The laser drive circuit 102 drives the light source 51 in accordance with the control from the controller 101. The rotation drive circuit 103 causes a current to flow through the coils 12 in accordance with the control from the controller 101. For example, the controller 101 controls the rotation drive circuit 103 such that the rotary part 20 rotates at a predetermined rotation speed. Accordingly, the magnitude and the timing of the current to be caused to flow from the rotation drive circuit 103 through the coils 12 are adjusted.

The signal processing circuit 104 performs amplification and noise removal processing on the detection signal inputted from the photodetector 57, and outputs the resultant signal to the controller 101. A communication interface 105 is an interface for performing communication with an apparatus in which the distance measurement device 1 is installed.

In a distance measurement operation, while controlling the rotation drive circuit 103 to rotate the mirror 54 together with the rotary part 20, the controller 101 controls the laser drive circuit 102 to output laser light of a predetermined pulse from the light source 51 at each predetermined timing. The controller 101 detects the timing when the laser light pulse emitted at each emission timing is received, on the basis of the detection signal of the photodetector 57 inputted from the signal processing circuit 104. Then, the controller 101 measures the distance to an object that exists in the distance measurement region at each emission timing, on the basis of the time difference (time of flight) between the timing when the laser light is emitted and the timing when the laser light is received.

The controller 101 transmits data of the distance calculated thus, via the communication interface 105 to the apparatus in which the distance measurement device 1 is installed, as needed. On the apparatus side, the distance to an object that exists in a range other than the angular range where entry of light to the opening 22*a* is prevented by the opaque region OR1, of a range of 360 degrees therearound, is acquired on the basis of the received distance data, and predetermined control is executed.

At a timing when the outlet (opening 33*a*) of the light blocking member 30 faces the opaque region OR1, the light source 51 also emits laser light in a pulsed manner with the same power as that at other timings. At this timing, the controller 101 refers to the detection signal outputted from the photodetector 57, that is, the detection signal based on the above-described internal stray light, to detect deterioration of the light source 51 and the photodetector 57.

Figure 10A:
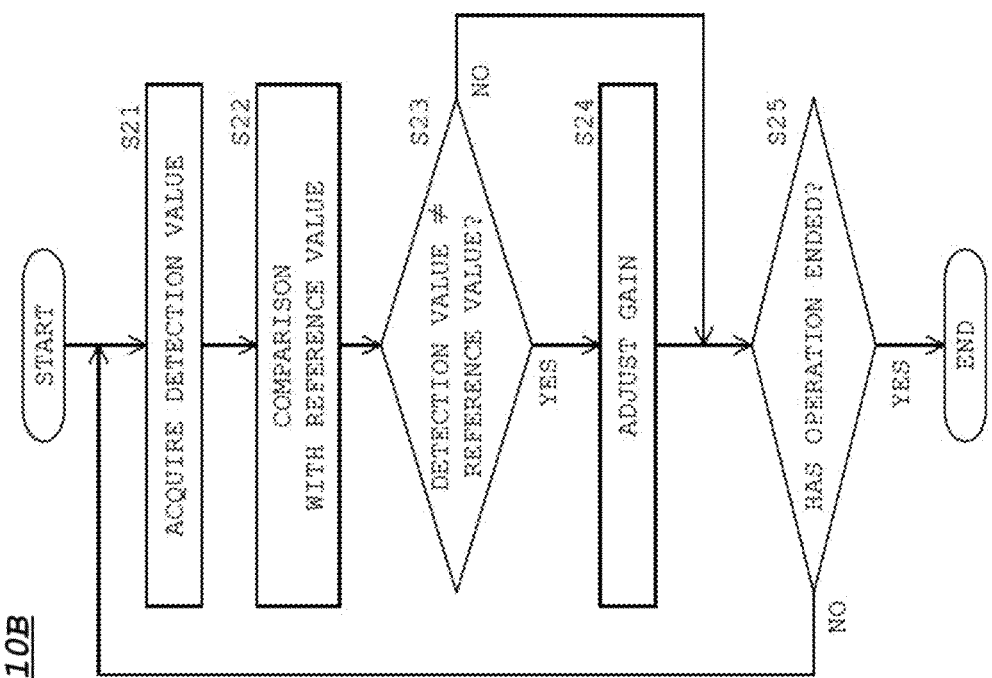
FIG. 10A and FIG. 10B are each a flowchart showing control performed when laser light is applied to the opaque region according to the embodiment.

FIG. 10A is a flowchart showing control for detecting deterioration of the light source 51 and the photodetector 57 using a detection signal for internal stray light.

At a timing when the outlet (opening 33*a*) of the light blocking member 30 faces the opaque region OR1, the controller 101 acquires the detection value of the detection signal outputted from the photodetector 57 (S11). Next, the controller 101 stores the acquired detection value as history information (S12), and calculates an evaluation parameter value for evaluating deterioration of the light source 51 and the photodetector 57, on the basis of the stored history information (S13).

The evaluation parameter value is, for example, a value indicating a decrease tendency in the detection value. Alternatively, the evaluation parameter value may be the difference between a detection value when the distance measurement device 1 is first started and the present detection value.

The controller 101 determines whether the calculated evaluation parameter value satisfies a preset deterioration condition (S14). For example, in the case where the evaluation parameter value is a value indicating a decrease tendency in the detection value, when the decrease tendency in the detection value is larger than a predetermined threshold, the controller 101 determines that the deterioration condition is satisfied. In addition, in the case where the evaluation parameter value is the difference between the detection value when the distance measurement device 1 is first started and the present detection value, when the difference exceeds a predetermined threshold, the controller 101 determines that the deterioration condition is satisfied. The deterioration condition may be another condition that allows deterioration of the light source 51 and the photodetector 57 to be detected.

When the evaluation parameter value satisfies the deterioration condition (S14: YES), the controller 101 determines that at least either the light source 51 or the photodetector 57 has deteriorated, and transmits warning information via the communication interface 105 to an apparatus in which the distance measurement device 1 is installed (S15). Upon receiving the warning information, the apparatus performs notification based on the warning information. Accordingly, a malfunction of the distance measurement device 1 can be prevented in advance. When the evaluation parameter value does not satisfy the deterioration condition (S14: NO), the controller 101 advances the process to step S16 without transmitting warning information.

Thereafter, the controller 101 determines whether the distance measurement operation of the distance measurement device 1 has ended (S16). When the distance measurement operation has not ended (S16: NO), the controller 101 returns the process to step S11 and performs the same control. When the distance measurement operation has ended (S16: YES), the controller 101 ends the deterioration detection control.

The control of FIG. 10A is control in the case where the recess 41*a* or 42*a* of the opaque region OR1 is adjusted such that internal stray light is incident on the photodetector 57 in an amount in which the output of the photodetector 57 is not saturated. On the other hand, in the case where the recess 41*a* or 42*a* of the opaque region OR1 is adjusted such that internal stray light is incident on the photodetector 57 in an amount in which the output of the photodetector 57 is saturated, for example, a condition that the detection value of the photodetector 57 becomes no longer saturated is set as the deterioration condition. That is, in this case, when the detection value of the photodetector 57 becomes no longer saturated, it is determined that deterioration has occurred in at least either the light source 51 or the photodetector 57, and warning information is transmitted from the controller 101.

In the control of FIG. 10A, deterioration of the light source 51 and the photodetector 57 is detected on the basis of the detection value of the internal stray light, but the light source 51 or the photodetector 57 may be controlled on the basis of the detection value of the internal stray light.

Figure 10B:
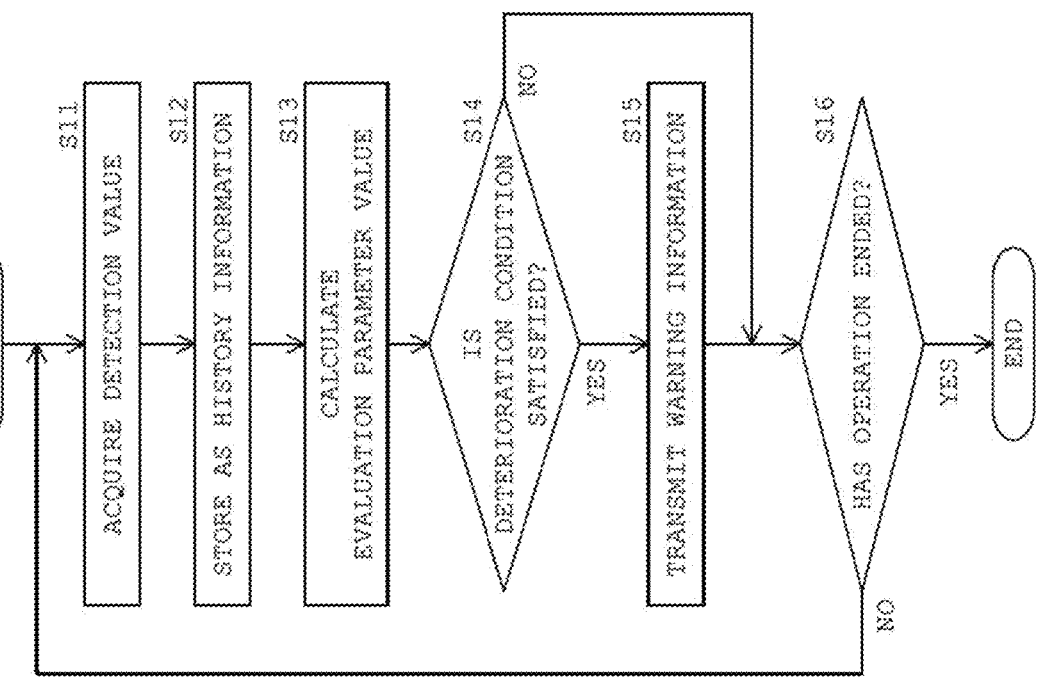

FIG. 10B is a diagram showing a flowchart in the case where the gain of the photodetector 57 is controlled on the basis of a detection value of internal stray light.

In the control of FIG. 10B, the light source 51 is separately controlled such that the amount of emitted light becomes a predetermined value. For example, in the case where the light source 51 is a semiconductor laser that includes a light receiving element for monitoring laser light emitted from the back side of a light emitting element, the light source 51 is controlled such that the output of the light receiving element becomes a predetermined value. Accordingly, the output of the light source 51 is maintained constant. The recess 41a or 42a of the opaque region OR1 is adjusted such that the output of the photodetector 57 is not saturated by internal stray light.

Under this condition, at a timing when the outlet (opening 33a) of the light blocking member 30 faces the opaque region OR1, the controller 101 acquires the detection value of the detection signal outputted from the photodetector 57 (S21). Next, the controller 101 compares the acquired detection value with a reference value (S22). The reference value is the value of the detection signal that should be outputted on the basis of internal stray light, and is stored in the controller 101 in advance.

When the difference between the detection value and the reference value exceeds a predetermined allowable value range (S23: YES), the controller 101 adjusts the gain of an amplifier for generating a detection signal, such that the detection value becomes closer to the reference value (S24). The amplifier is included in the signal processing circuit 104 in FIG. 9. On the other hand, when the difference between the detection value and the reference value does not exceed the predetermined allowable value range (S23: NO), the controller 101 advances the process to step S25 without adjusting the gain.

While the distance measurement operation continues (S25: NO), the controller 101 repeatedly executes the processes in step S21 and the subsequent steps. When the distance measurement operation has ended (S25: YES), the controller 101 ends the gain control on the photodetector 57.

Effects of Embodiment

According to the embodiment described above, the following effects are achieved.

The light blocking member 30 prevents the laser light from leaking to the inside of the device from the optical path of the laser light. Accordingly, internal stray light can be more reliably prevented from reaching the photodetector 57. Therefore, the influence of internal stray light on the distance measurement can be more reliably suppressed.

As shown in FIG. 3, the light source 51 and the collimator lens 52 are housed in the holder 53, and the light blocking member 30 is disposed such that the inlet portion for the laser light (pedestal portion 32) of the light blocking member 30 covers the holder 53 from the collimator lens 52 side (upper side). Accordingly, stray light generated inside the holder 53 is taken into the light blocking member 30 and does not become internal stray light, and stray light that enters the inside of the light blocking member 30 through the outlet (opening 33a) of the light blocking member 30 is taken into the holder 53 and does not become internal stray light. Thus, generation of internal stray light can be more reliably prevented.

As shown in FIG. 3, the holder 53 is embedded at the center of the condensing lens 55. Accordingly, an optical element for separating the laser light emitted from the light source 51 and reflected light, of the laser light, reflected from the distance measurement region toward the photodetector 57 is unnecessary, so that stray light generated by the optical element can be prevented from becoming internal stray light. Thus, generation of internal stray light can be more reliably prevented.

As shown in FIG. 3, the distance measurement device 1 includes the fixing part 10, the rotary part 20 supported by the fixing part 10 so as to be rotatable about the rotation center axis R10, and the mirror 54 installed in the rotary part 20 so as to be inclined relative to the rotation center axis R10. The condensing lens 55 is disposed in the fixing part 10 such that the optical axis thereof coincides with the rotation center axis R10, and the light blocking member 30 has the inclined surface 34 along the inclination of the mirror 54, and the opening 34a formed in the inclined surface 34, and is disposed at the rotary part 20 such that the opening 34a is closed by the mirror 54. The light blocking member 30 surrounds the optical path of the laser light before and after being bent by the mirror 54. By closing the opening 34a by the mirror 54 as described above, a mirror for bending the optical path of the laser light does not need to be provided inside the light blocking member 30, and the configuration can be simplified.

As shown in FIG. 3, the distance measurement device 1 has the opaque region OR1 which faces the outlet (opening 33a) of the light blocking member 30 when the rotary part 20 is at the predetermined rotation position. As shown in FIG. 6A to FIG. 7B, the opaque region OR1 is provided with the recess 41a or 42a which reflects a part of the laser light emitted from the outlet (opening 33a) of the light blocking member 30 and directs the part of the laser light to the outside of the end portion on the outlet (opening 33a) side (end surface 33) of the light blocking member 30. Thus, for example, as shown in FIG. 10A, deterioration of the light source 51 and the photodetector 57 can be detected on the basis of internal stray light generated by the recess 41a or 42a, and notification based on the deterioration can be performed as appropriate. Accordingly, the distance measurement device 1 can be stably operated. In addition, the amount of internal stray light can be easily controlled by the shape of the recess 41a or 42a, and, for example, the amount of the internal stray light can be controlled to an amount in which the photodetector 57 is not saturated. Furthermore, the recess 41a or 42a is unlikely to deteriorate, and thus can continue to stably generate internal stray light.

As shown in FIG. 3, the distance measurement device 1 includes the transparent cover 40 which is installed on the fixing part 10 and covers the top and the lateral side of the rotary part 20, and the opaque region OR1 is provided on the cover 40. Accordingly, another member does not need to be disposed as the opaque region for generating internal stray light, so that the configuration can be simplified. The cover 40 can prevent dust and the like from entering the inside of the device.

As shown in FIG. 6B, the opaque region OR1 can be configured by forming the reflecting surface 42 on the inner surface of the cover 40. Alternatively, as shown in FIG. 6A, the opaque region OR1 can be configured by installing the opaque member 41 on the inner surface of the cover 40. In the configuration of FIG. 6B, the opaque member 41 does not need to be additionally installed, so that the workability is improved. In addition, in the configuration of FIG. 6A, the laser light can be attenuated by the opaque member 41, so that it is easy to generate internal stray light by which the photodetector 57 does not become saturated.

In the configuration of FIG. 6B, the reflecting surface 42 does not necessarily have to be a mirror surface, and it is sufficient that the reflecting surface 42 has a function not to allow laser light to pass therethrough and to generate reflected light. For example, the reflecting surface 42 may be formed by applying an opaque material to the opaque region OR1.

As shown in FIGS. 6A and 6B, each of the recesses 41a and 42a has a configuration having the valley line L1 or L2 and the two slopes 41a1 or 42a1 joined at the valley line L1 or L2. Thus, for example, as shown in FIGS. 7A and 7B and FIGS. 8A and 8B, the laser light can be deviated from the end surface 33 of the light blocking member 30 only in the direction parallel to the X-Y plane to generate internal stray light, so that the amount of the internal stray light can be reduced to be small. Accordingly, the amount of the internal stray light reaching the photodetector 57 can be smoothly controlled to be in a desired range.

As shown in FIG. 10A, the controller 101 executes control in which the controller 101 causes laser light to be emitted from the light source 51 and also acquires the detection signal of the photodetector 57 at a timing when the outlet (opening 33a) of the light blocking member 30 faces the opaque region OR1, and determines whether trouble (deterioration) has occurred in at least either the light source 51 or the photodetector 57, on the basis of the acquired detection signal. Accordingly, trouble (deterioration) of the light source 51 and the photodetector 57 can be appropriately determined on the basis of internal stray light generated by the recess 41a or 42a of the opaque region OR1.

As shown in FIG. 10B, the controller 101 executes control in which the controller 101 causes laser light to be emitted from the light source 51 and also acquires the detection signal of the photodetector 57 at a timing when the outlet (opening 33a) of the light blocking member 30 faces the opaque region OR1, and adjusts the gain for the detection signal of the photodetector 57 on the basis of the acquired detection signal. Accordingly, the gain of the photodetector 57 can be appropriately adjusted on the basis of internal stray light generated by the recess 41a or 42a of the opaque region OR1.

In FIG. 10B, the gain of the photodetector 57 is adjusted on the basis of the detection signal for the internal stray light, but the output of the light source 51 may be controlled on the basis of the detection signal for the internal stray light. For example, the output of the light source 51 may be controlled such that the detection signal for the internal stray light becomes a predetermined value.

<Modifications>

The configuration of the distance measurement device 1 can be modified in various ways other than the configuration shown in the above embodiment.

For example, in the above embodiment, as shown in FIGS. 6A and 6B, the recesses 41a and 42a are formed such that the valley lines L1 and L2 are parallel to the Z axis, but the direction in which the recesses 41a and 42a extend is not limited thereto.

Figure 11A:
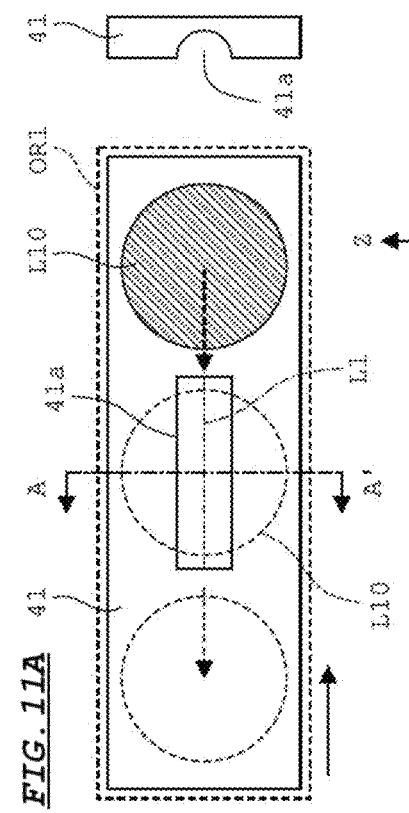
FIG. 11A, FIG. 11B, FIG. 11C, FIG. 11D, and FIG. 11E are each a diagram schematically showing a configuration of an opaque region according to a modification.
Figure 11B:
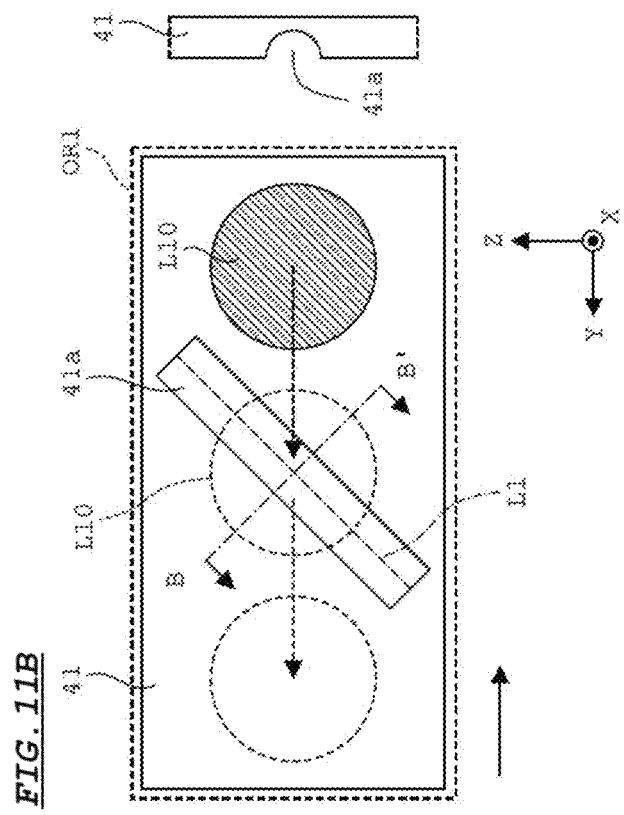

For example, the recess 41a may be formed such that the valley line L1 extends in the circumferential direction of the inner surface of the cover 40 as shown in FIG. 11A, or the recess 41a may be formed such that the valley line L1 is inclined relative to the circumferential direction of the inner surface of the cover 40 as shown in FIG. 11B. An A-A' cross-section and a B-B' cross-section of the configurations of FIGS. 11A and 11B are shown on the right sides of FIGS. 11A and 11B, respectively. In addition, L10 indicates an irradiation region where laser light is applied, and each circle shown by a broken line indicates a subsequent irradiation region where laser light is applied. As the rotary part 20 rotates, the opaque region OR1 moves in a solid line arrow direction, and the irradiation region L10 moves relative to the opaque region OR1 in a broken line arrow direction.

Even with these configurations, similar to the above embodiment, the amount of internal stray light can be smoothly controlled. The recess 42a formed on the reflecting surface 42 can also be changed in the same manner as in FIGS. 11A and 11B.

In the above embodiment, the recesses 41a and 42a are formed so as to fully traverse the irradiation region where laser light is applied to the opaque region OR1, but the method for forming the recesses 41a and 42a is not limited thereto.

Figure 11C:
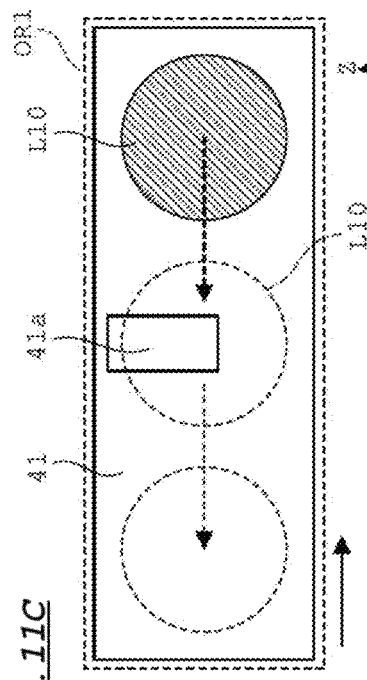

For example, as shown in FIG. 11C, the recess 41a may be formed so as not to traverse the irradiation region L10. In this case, the amount of internal stray light generated by the recess 41a is smaller than that in the case where the recess 41a fully traverses the irradiation region L10 as in the above embodiment. The amount of internal stray light can also be controlled by how much the recess 41a overlaps the irradiation region L10. The recess 42a formed on the reflecting surface 42 can also be changed in the same manner as in FIG. 11C.

In the above embodiment, as shown in FIGS. 6A and 6B, the cross-sectional shapes of the recesses 41a and 42a are arc shapes. However, the cross-sectional shapes of the recesses 41a and 42a are not limited thereto.

Figure 11D:
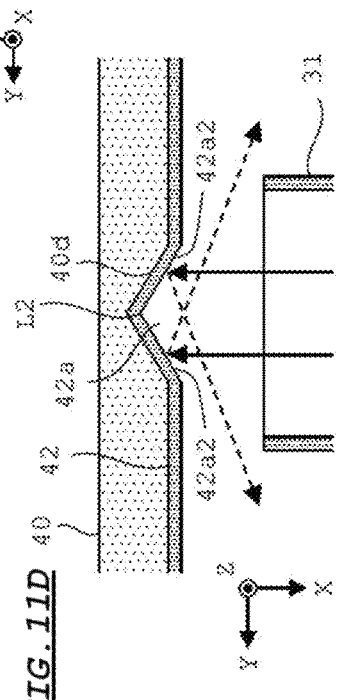

For example, the cross-sectional shape of the recess 42a may be a valley shape having two flat slopes 42a1 as shown in FIG. 11D, or may be a shape having a curved surface and a flat surface. The same applies to the cross-sectional shape of the recess 41a. The cross-sectional shapes of the recesses 41a and 42a can be changed as appropriate as long as the amount of internal stray light can be appropriately controlled.

In each of the above embodiment and the modifications of FIGS. 11A to 11D, the recess 41a or 42a is formed in the opaque region OR1 as the structure for generating internal stray light. However, the structure for generating internal stray light is not limited to the recesses 41a and 42a.

Figure 11E:
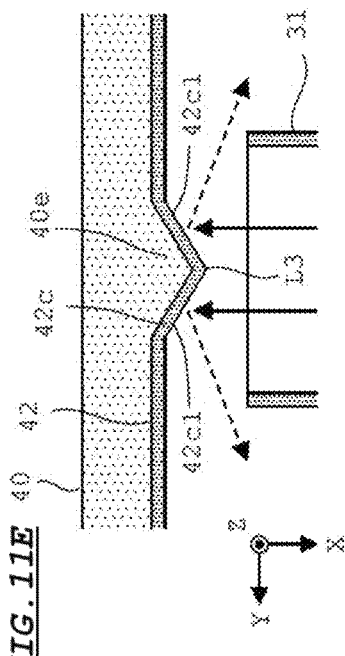

For example, as shown in FIG. 11E, a projection 42c having two slopes 42c1 connected at a ridge L3 parallel to the Z-axis direction may be disposed in the opaque region OR1. In this case, the projection 42c is formed by forming a projection 40e on the inner surface of the cover 40 so as to extend in the Z-axis direction, and forming the reflecting surface 42 on the inner surface of the cover 40. Even with this configuration, the laser light reflected by the two slopes 42c1 can be released to the outside from the end portion of the tube portion 31 to generate internal stray light. Similar to FIG. 11E, a projection may also be formed on the opaque member 41 to generate internal stray light. In addition, the slopes of the projection do not necessarily have to be flat surfaces, and may be curved surfaces that outwardly project or are inwardly recessed. The shape of the projection can be changed as appropriate as long as internal stray light can be appropriately controlled.

In each of the above embodiment and modifications, the structure for generating internal stray light is the recess or the projection extending in the predetermined direction, that is, the recess or the projection having a valley line or a ridge. However, the structure for generating internal stray light may be a recess or a projection not having a valley line or a ridge. For example, the structure for generating internal stray light may be a recess or a projection having a hemispherical shape. In this case, laser light reflected by the recess or the projection protrudes from the end surface 33 to the outside thereof over the entire circumference of the end surface 33 of the light blocking member 30, and the protruding laser light becomes internal stray light. When the laser light protrudes from the end surface 33 over the entire circumference as described above, it is slightly difficult to control the amount of internal stray light as compared to the above embodiment. Thus, in order to more smoothly control the amount of internal stray light, a recess or a projection having a valley line or a ridge is preferably used as the structure for generating internal stray light, as in the above embodiment and modifications.

Each of the shapes of the recesses 41a and 42a does not necessarily have to be symmetrical with respect to a plane that passes through the position of the valley line L1 or L2 and that is parallel to the depth direction of the recess 41a or 42a. Similarly, the shape of the projection 42c also does not necessarily have to be symmetrical with respect to a plane that passes through the position of the ridge L3 and that is parallel to the height direction of the projection 42c. Moreover, the recesses 41a and 42a do not necessarily have to extend in a straight manner, and the projection 42c also does not necessarily have to extend in a straight manner.

In the above embodiment, the opaque region OR1 is provided on the inner surface of the cover 40. However, the opaque region OR1 may be provided on the outer surface of the cover 40.

In the above embodiment, the opaque region OR1 is provided on the cover 40. However, a member for forming the opaque region OR1 may be additionally disposed. In the case where the distance measurement device 1 does not include the cover 40, a member for forming the opaque region OR1 may be additionally disposed.

In the above embodiment, as shown in FIG. 3, the light blocking member 30 is provided with the opening 34a, and the opening 34a is closed by the mirror 54. However, the internal space of the light blocking member 30 may be formed as a closed space without providing the opening 34a, and a reflecting surface may be formed in a region, corresponding to the opening 34a, of the inner surface of the light blocking member 30.

The range where the light blocking member 30 covers the optical path of the laser light is not necessarily limited to the range shown in FIG. 3. For example, the end surface 33 may be closer to the inner surface of the cover 40, or the end surface 33 may be farther from the cover 40. In addition, the pedestal portion 32 does not have to be provided to the light blocking member 30, and the hole 37 for passing laser light therethrough may be merely formed in the light blocking member 30. The light blocking member 30 does not necessarily have to have a cylindrical shape, and may have, for example, a tubular shape with a square cross-section. The through hole 35 also does not have to have a circular shape, but may have, for example, a quadrangular shape. In addition, the shape and arrangement of the light blocking member 30 can be changed as appropriate in accordance with change of the optical system.

The configuration of the optical system is not limited to the configuration of the above embodiment, and can be changed as appropriate. For example, in the above embodiment, the mirror 54 having a shape long in the Y-axis direction is provided, but a square mirror may be used. In addition, the light source 51 and the collimator lens 52 do not have to be embedded in the condensing lens 55, and an optical system in which the optical path of the laser light emitted from the light source 51 and the optical path of the reflected light, of the laser light, which is reflected at the distance measurement region and incident on the photodetector 57 are branched by an optical element, may be configured.

In the above embodiment, the coils 12 and the magnets 23 are disposed in the fixing part 10 and the rotary part 20, respectively, and the rotary part 20 is driven. However, the rotary part 20 may be driven by another drive mechanism. For example, a gear may be provided on the outer peripheral surface of the rotary part 20 over the entire circumference, and a drive mechanism may be configured such that a gear installed on a drive shaft of a motor meshes with this gear.

The configuration for rotatably supporting the rotary part 20 is not limited to the configuration of the above embodiment. In addition, the projection direction of the laser light (projection light) does not necessarily have to be the direction perpendicular to the rotation center axis R10, and may be inclined at a predetermined angle relative to the direction perpendicular to the rotation center axis R10. The number of coils 12 disposed and the number of magnets 23 disposed can also be changed as appropriate.

The structure according to the present invention can also be applied to a device that does not have a distance measurement function and has only a function of detecting whether or not an object exists in the projection direction, on the basis of a signal from the photodetector 57. In this case as well, trouble of the light source 51 and the photodetector 57 can be appropriately detected on the basis of internal stray light generated by the opaque region OR1.

In addition to the above, various modifications can be made as appropriate to the embodiments of the present invention, without departing from the scope of the technological idea defined by the claims.

What is claimed is:

1. A distance measurement device for measuring a distance to an object that exists in a distance measurement region, the distance measurement device comprising:
  a light source configured to emit laser light;
  a lens configured to converge the laser light emitted from the light source, into substantially parallel light;
  a tubular light blocking member disposed on an optical path of the laser light emitted from the light source and surrounding the optical path;
  a photodetector configured to detect reflected light, of the laser light, reflected at the distance measurement region;
  a condensing lens configured to condense the reflected light passing through the outside of the light blocking member, onto the photodetector;
  a fixing part; and
  a rotary part supported by the fixing part so as to be rotatable about a rotation center axis, wherein
  the light blocking member is disposed at the rotary part such that an outlet thereof for the laser light faces in a direction away from the rotation center axis, the distance measurement device comprises an opaque region facing the outlet when the rotary part is at a predetermined rotation position, and the opaque region is provided with a recess or a projection configured to reflect a part of the laser light emitted from the outlet and direct the part of the laser light to the outside of an end portion on the outlet side of the light blocking member.

2. The distance measurement device according to claim 1, wherein the light source and the lens are housed in a holder, and the light blocking member is disposed such that an inlet portion, for the laser light, of the light blocking member covers the holder from the lens side.

3. The distance measurement device according to claim 2, wherein the holder is embedded at a center of the condensing lens.

4. The distance measurement device according to claim 3, further comprising:

a mirror installed in the rotary part so as to be inclined relative to the rotation center axis, wherein the condensing lens is disposed in the fixing part such that an optical axis thereof coincides with the rotation center axis, the light blocking member has an inclined surface along an inclination of the mirror, and an opening formed in the inclined surface, and is disposed at the rotary part such that the opening is closed by the mirror, and the light blocking member surrounds the optical path of the laser light before and after being bent by the mirror.

5. The distance measurement device according to claim 1, further comprising a cover installed on the fixing part so as to cover a top and a lateral side of the rotary part and being transparent at least at an emission wavelength of the light source, wherein the opaque region is provided on the cover.

6. The distance measurement device according to claim 5, wherein the opaque region is configured by forming a reflecting surface on an inner surface of the cover.

7. The distance measurement device according to claim 5, wherein the opaque region is configured by installing an opaque member on an inner surface of the cover.

8. The distance measurement device according to claim 1, wherein the recess has a valley line and two slopes joined at the valley line, and the projection has a ridge line and two slopes joined at the ridge line.

9. The distance measurement device according to claim 1, further comprising a controller configured to cause the laser light to be emitted from the light source and also acquire a detection signal of the photodetector at a timing when the outlet faces the opaque region, and determine whether trouble has occurred in at least one of the light source and the photodetector, on the basis of the acquired detection signal.

10. The distance measurement device according to claim 1, further comprising a controller configured to cause the laser light to be emitted from the light source and also acquire a detection signal of the photodetector at a timing when the outlet faces the opaque region, and control at least one of output of the light source and gain for the detection signal of the photodetector, on the basis of the acquired detection signal.

* * * * *